(12) United States Patent
Wheeler et al.

(10) Patent No.: US 7,920,347 B2
(45) Date of Patent: Apr. 5, 2011

(54) SHROUD FOR HEAD GIMBAL ASSEMBLY TESTING

(75) Inventors: Steven E. Wheeler, Northfield, MN (US); Timothy J. Fleming, Apple Valley, MN (US); Klaus Obergfell, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 210 days.

(21) Appl. No.: 12/165,218

(22) Filed: Jun. 30, 2008

(65) Prior Publication Data

US 2009/0323210 A1 Dec. 31, 2009

(51) Int. Cl.
*G11B 27/36* (2006.01)
*G11B 5/54* (2006.01)
(52) U.S. Cl. .......... 360/31; 360/75; 360/245.3; 360/254
(58) Field of Classification Search .................. None
See application file for complete search history.

(56) References Cited

U.S. PATENT DOCUMENTS

| 4,473,855 | A  | * | 9/1984 | Plotto et al. ............ 360/244.2 |
| 5,136,438 | A  | * | 8/1992 | Wakatsuki et al. ......... 360/69 |
| 5,187,626 | A  | * | 2/1993 | Hopkins et al. .......... 360/265.9 |
| 6,710,977 | B2 | * | 3/2004 | Tadepalli et al. ......... 360/244.2 |
| 7,538,981 | B1 | * | 5/2009 | Pan ...................... 360/264.2 |
| 2007/0136022 | A1 | * | 6/2007 | Anderson et al. ........... 702/115 |

OTHER PUBLICATIONS

"Head Gimbal Assembly Loading with Fixed Mounting Surface," U.S. Appl. No. 11/517,701, filed Sep. 8, 2006.

* cited by examiner

*Primary Examiner* — Jason C Olson
(74) *Attorney, Agent, or Firm* — Sandars Gwin

(57) ABSTRACT

In one implementation, an assembly for testing a head gimbal assembly comprises a rotatable test disc, a mounting surface configured to mount the head gimbal assembly, and a shroud covering the head gimbal assembly. The mounting surface is located in proximity to the test disc to facilitate loading the head gimbal assembly on the test disc. The shroud is configured to shield the head gimbal assembly from airflow produced when the test disc rotates.

16 Claims, 6 Drawing Sheets

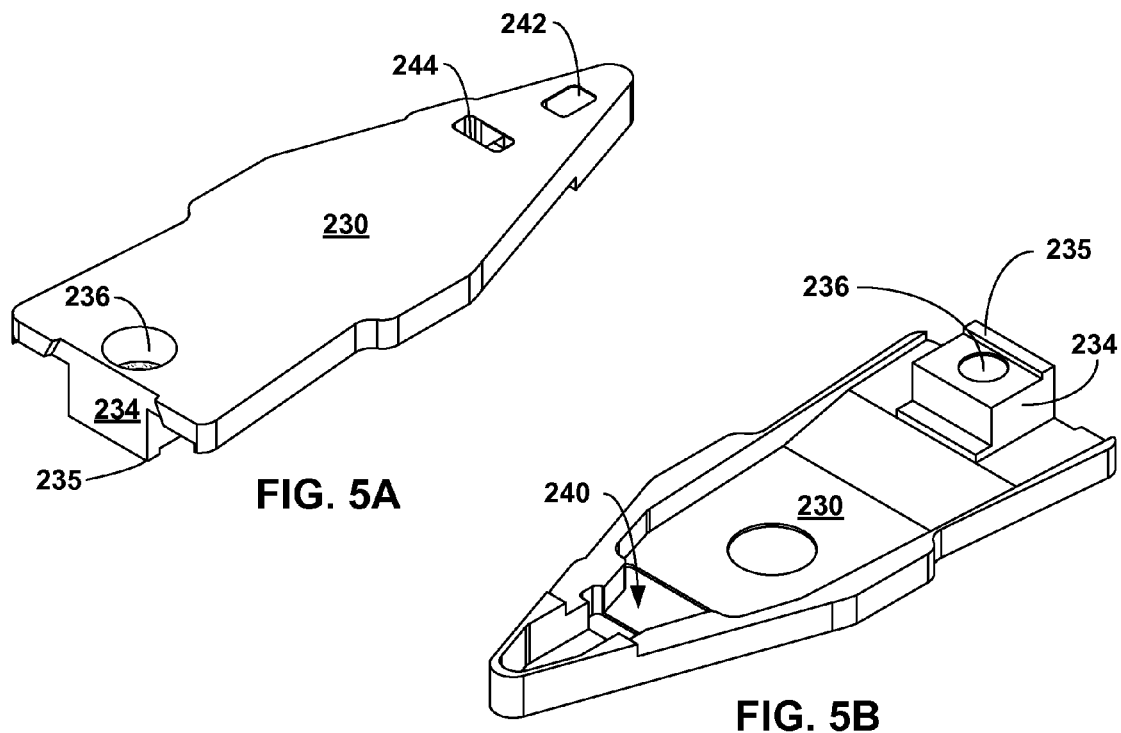
FIG. 5A
FIG. 5B
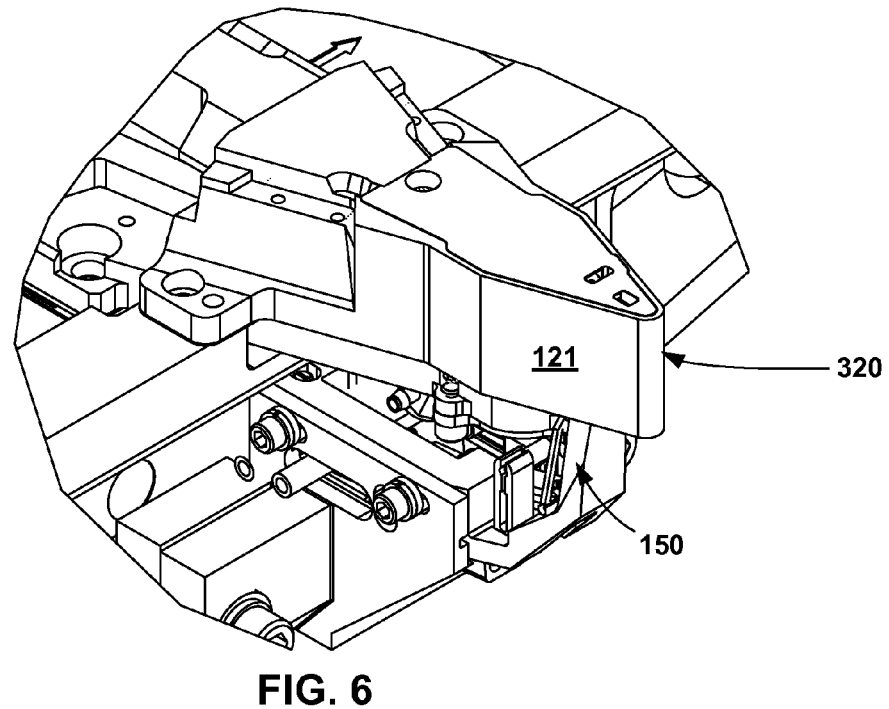
FIG. 6

SHROUD FOR HEAD GIMBAL ASSEMBLY TESTING

BACKGROUND

Prior to installing a head gimbal assembly (HGA) into a disc drive, it is desirable to dynamically test the functionality of the read and write transducers that reside on the HGA to determine if the HGA is defective. Testing is generally performed using HGA tester that includes a mounting fixture for supporting the HGA as well as a rotatable test disc. Such testing can include preliminary activities to align, configure, and prepare the HGA for testing, followed by the actual dynamic electrical test of the HGA.

During a dynamic electrical test procedure, the HGA is mounted on the mounting fixture of an HGA tester that supports the HGA throughout the testing process. For example, an operator may manually place the HGA into an alignment tool that sets the orientation of the HGA to an intermediate mounting fixture. The HGA is then loaded onto the rotating test disc such that the head of the HGA is suspended above the test disc by the air-bearing formed between the head and the disk. The HGA is then subjected to dynamic electrical testing, which may include, e.g., reading and writing to the test disc as well as monitoring for undesirable contact between the head and the test disc.

An HGA tester must be at least capable of holding the HGA on-track for a given track density of a product, which is commonly measured in tracks-per-inch (TPI). As track densities in disc drives increase, it becomes more difficult to provide HGA testers capable of holding the HGA on-track during testing.

SUMMARY

In one implementation, an assembly for testing a head gimbal assembly comprises a rotatable test disc, a mounting surface configured to mount the head gimbal assembly, and a shroud covering the head gimbal assembly. The mounting surface is located in proximity to the test disc to facilitate loading the head gimbal assembly on the test disc. The shroud is configured to shield the head gimbal assembly from airflow produced when the test disc rotates.

These and other various features and advantages will be apparent from a reading of the following detailed description.

BRIEF DESCRIPTION OF DRAWINGS

FIGS. 5A-5B illustrate detailed views of an alternative implementation to the shroud covers shown in FIGS. 2-4.

FIG. 6 illustrates a shroud including the shroud cover shown in FIGS. 5A-5B as part of an HGA tester.

DETAILED DESCRIPTION

One source of positional disturbance that can affect the effective track density of an HGA tester is external air turbulence caused by the rotation of the test disc. The evolution of disc drive technologies has lead to ever-faster disc rotational velocities, which has increased external air turbulence caused by the rotation of the test disc during dynamic electrical testing of HGAs. This air turbulence can excite the HGA and cause vibrations within the HGA. These vibrations can be significant at current and higher track densities and limit the TPI capability of the HGA tester. As disclosed herein, in order to reduce excitation of an HGA during testing, an HGA tester may include a shroud that shields the HGA from airflow caused by the rotating test disc.

Figure 1A:
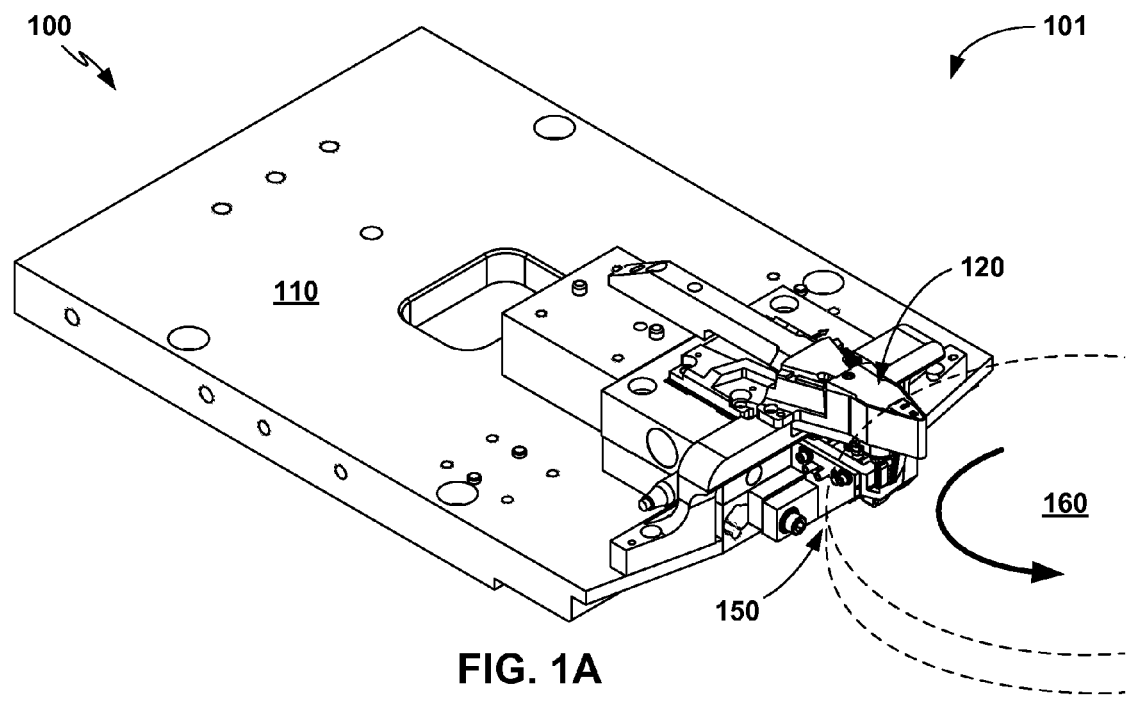
FIGS. 1A-1C illustrate an assembly including an HGA mounted on an HGA tester, the HGA tester including a rotating test disc and a shroud that shields the HGA from airflow produced by the rotating test disc.
Figure 1B:
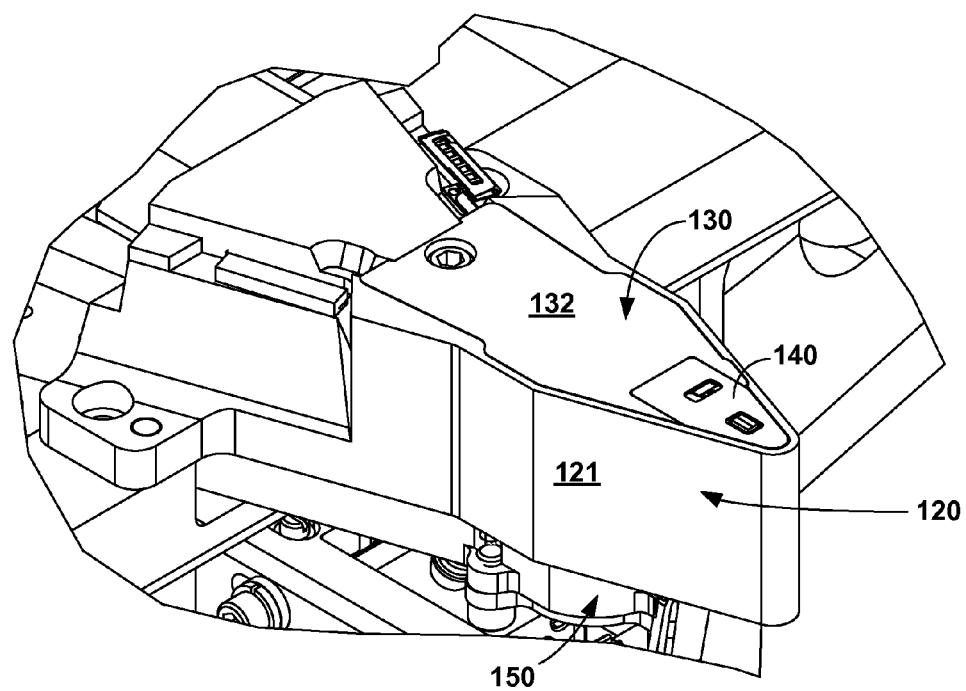
Figure 1C:
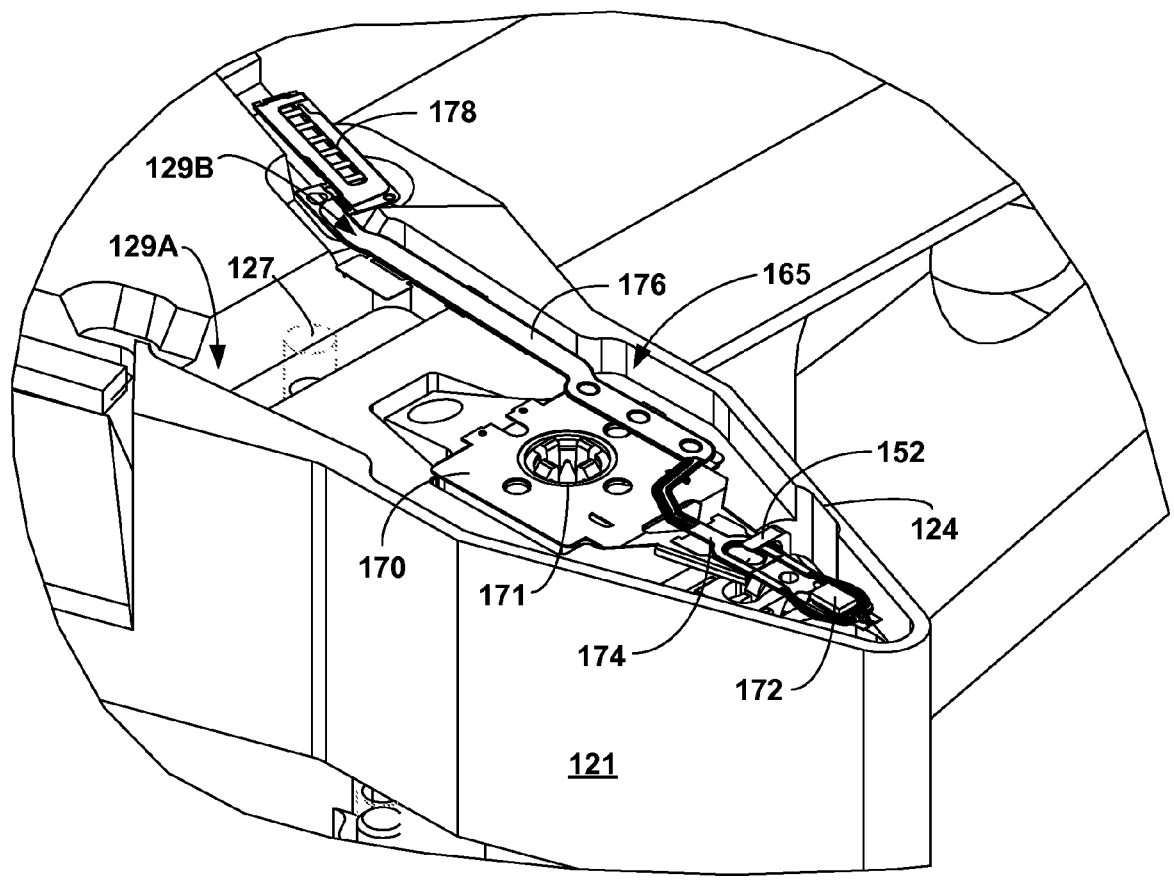

FIGS. 1A-1C illustrate assembly 100, which includes HGA 170 mounted on HGA tester 101. More specifically, FIG. 1A illustrates a perspective view of assembly 100; FIG. 1B illustrates a close-up view of a portion of assembly 100, and FIG. 1C illustrates a close-up view of a portion of assembly 100 with shroud cover 130 removed to show HGA 170 mounted on mounting platform 165 of HGA tester 101. HGA tester 101 includes stationary base 110, HGA loader 150, rotating test disc 160 and shroud 120, which includes base 121 and cover 130. Rotating test disc 160 is a recordable media such as a rewriteable magnetic media, whereas the other components of HGA tester 101 may be formed from metal such a stainless steel.

Base 121 of shroud 120 and mounting surface 165 may be mounted to stationary base 110 to allow positioning HGA 170 in proximity to test disc 160 to facilitate dynamic electrical testing of HGA 170. In other implementations, test disc 160 may be moveable to allow positioning mounting surface 165 in proximity to test disc 160.

As shown in FIG. 1C, HGA 170 is mounted to mounting platform 165, which is surrounded by shroud 120. Base 121 includes aperture 126 (FIG. 2), which provides space for mounting platform 165 to extend into shroud 120. HGA 170 includes a boss hole 171, which is used to secure HGA 170 to mounting platform 165 within shroud 120. HGA 170 further includes head 172, which includes read and write transducers, load beam 174, electrodes 178 and tail 176. Electrodes 178 provide an interface for circuitry (not shown) used to control read and write operations of HGA 170 during a dynamic electrical test. Tail 176 includes a flex circuit that provides electrical connections between head 172 and electrodes 178. For example, the electrical connections may comprise copper traces on tail 176.

Base 121 includes depressions 129A and 129B, each of which are configured to support an HGA tail during a testing operation. For example, as shown in FIG. 1C, HGA tail 176 is supported by depression 129B of base 121. Depression 129B includes surfaces to support tail 176 and help position electrodes 178 precisely for an interconnection with the circuitry used to control read and write operations of HGA 170 during a dynamic electrical test. Likewise, depression 129A is suitable for an HGA including a tail extending from the opposite side of the HGA as compared to tail 176 on HGA 170.

As shown in FIG. 1A, HGA tester 101 includes load mechanism 150. Load mechanism 150 includes a load finger 152 (FIG. 1C). Load finger 152 is suitable to deflect load beam 174 to facilitate positioning HGA 170 in proximity to test disc 160 and loading HGA 170 on test disc 160 without allowing head 172 to contact test disc 160. Load finger 152 also allows the installation of cover 130 on base 121 without contacting HGA 170. Base 121 includes aperture 128 (FIG. 2), which provides space for load mechanism 150 including load finger 152 to extend into shroud 120. A description of a load mechanism including a load finger is described in U.S. patent application Ser. No. 11/517,701 filed Sep. 8, 2006 and titled "HEAD GIMBAL ASSEMBLY LOADING WITH FIXED MOUNTING SURFACE," the entire content of which is incorporated herein by reference. While the described load mechanism includes a tilting mounting platform for mounting an HGA as well as a load finger for deflecting the load beam of an HGA, mounting platform 165 may either be a tilting platform or a non-tilting platform.

Figure 2:
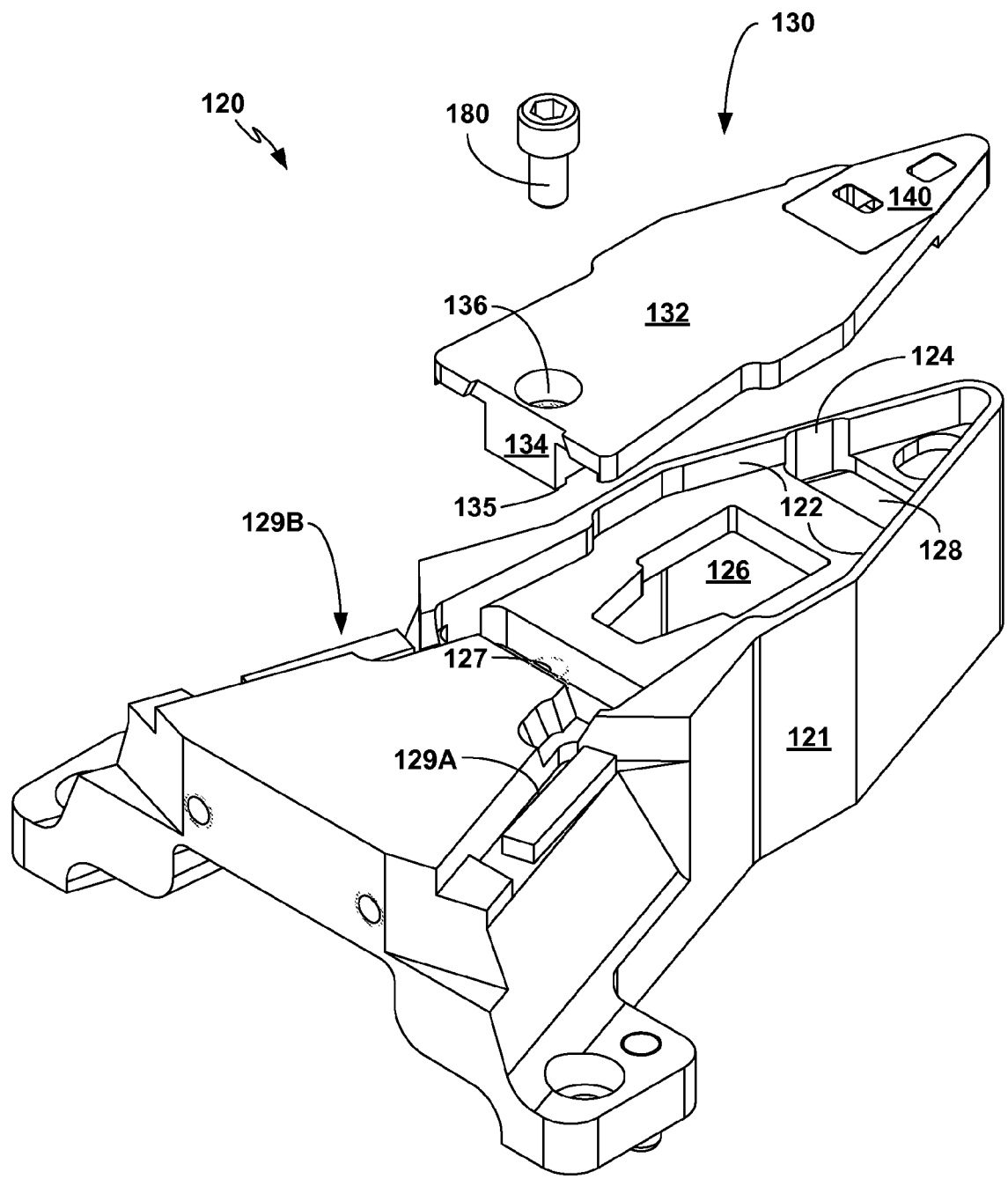
FIG. 2 illustrates an exploded view of the shroud in FIGS. 1A-1C including a base and a cover.

Shroud 120, which is shown separately in FIG. 2, shields HGA 170 from airflow produced by rotating test disc 160. As previously mentioned, shroud 120 includes base 121 and cover 130. Base 121 and cover 130 combine to shield HGA 170 from airflow produced from rotating test disc 160 by substantially enclosing HGA 170. Base 121 includes sidewalls 122 that shield HGA 170 from airflow produced from rotating test disc 160. For example, shroud 120 shields a majority of tail 176 from airflow produced by rotating test disc 160. Cover 130 fits closely within sidewalls 122 to limit airflow passing through the interface of base 121 and cover 130. In other implementations, sidewalls 122 may be part of cover 130 or a combination of cover 130 and base 121.

Figure 3A:
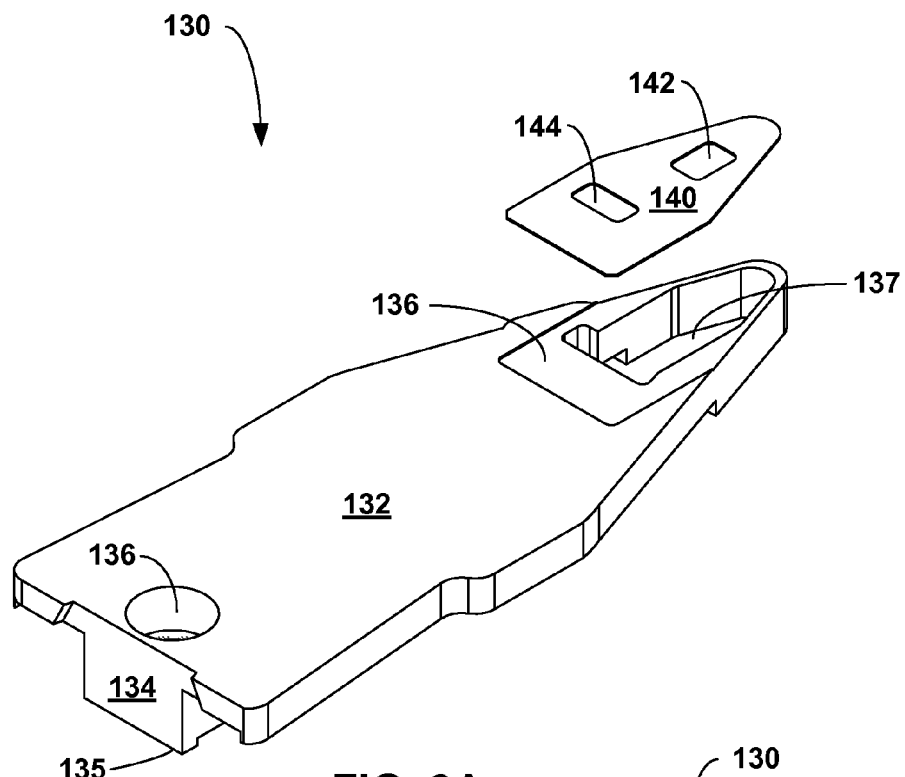
FIGS. 3A-3B illustrate detailed views of the shroud cover shown in FIG. 2.
Figure 3B:
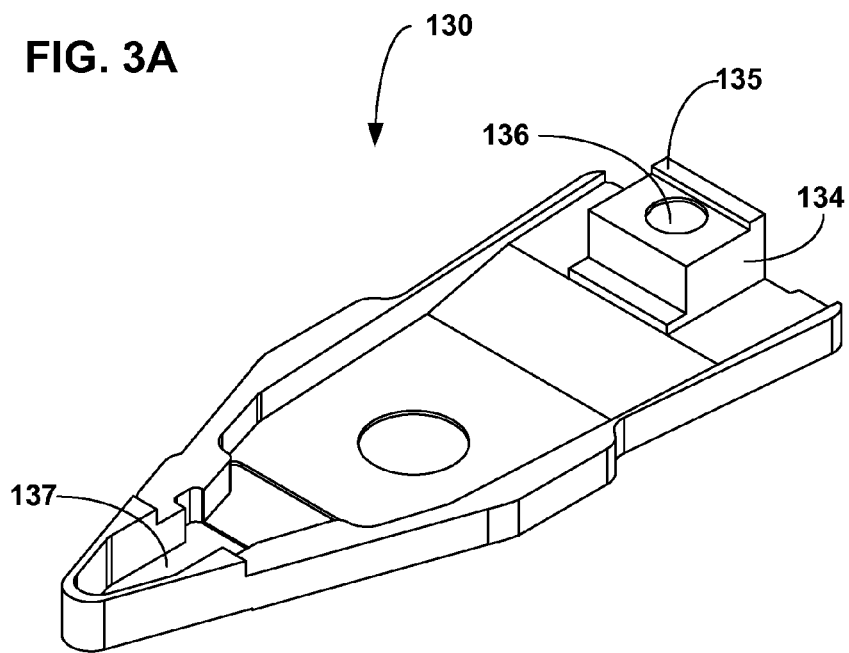

Cover 130 of shroud 120 is shown separately in FIGS. 3A-3B. Cover 130 includes two components, component 132, which provides a majority of the structure of cover 130 and component 140, which is attached to component 132. Component 140 sits above hole 137 in depression 136 of component 132. Generally depression 136 is will have a depth equal to the thickness of component 140 to provide a substantially planar top surface. Component 140 may be secured to component 132 using glue such as epoxy or by other techniques. Component 140 is made of a very thin material such as stainless steel. For example, component 140 may be in the range of 0.0005 inches to 0.010 inches thick. As another example, component 140 may be about 0.002 inches thick. The small thickness of component 140 is necessary to allow HGA 170 to be loaded on test disc 160 without contacting cover 130.

Component 140 includes two apertures 142, 144. Apertures 142, 144 are located above hole 137 of component 132. Hole 137 and aperture 142 allow head 172 of HGA 170 to interface with test disc 160. Comparatively, hole 137 and aperture 144 provide space that allows retractable finger 152 to move into position to deflect load beam 174. Notably, base 121 (FIG. 2) of shroud 120 is also configured to provide space that allows retractable finger 152 to move into position to deflect load beam 174. For example, base 121 includes depression 124 in sidewalls 122.

Figure 4:
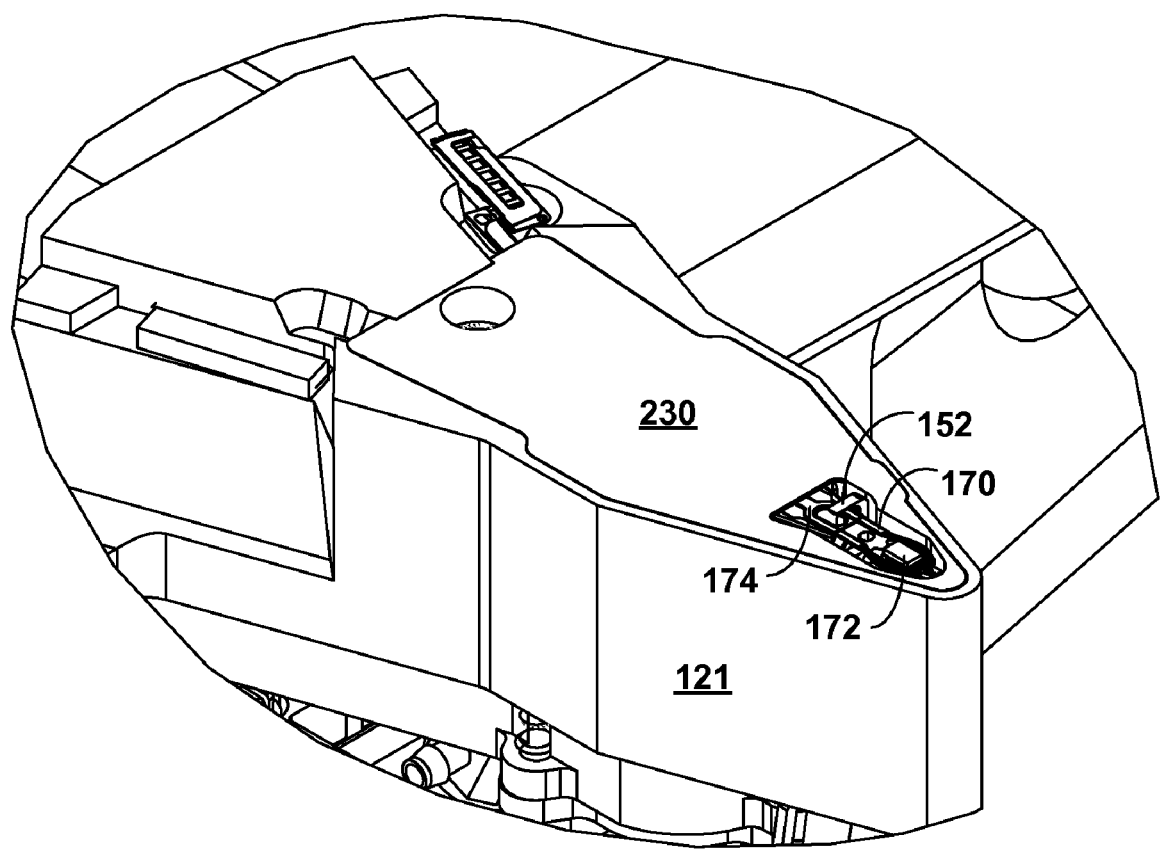
FIG. 4 illustrates a detailed view of an alternative implementation to the shroud cover shown in FIGS. 2 and 3A-3B.

While cover 130 includes two components 132, 140, in other implementations, a cover may include only a single component. One example of such an implementation is shown in FIG. 4. However, manufacturing a cover having all the features of cover 130 from a single component may be more difficult and/or expensive than manufacturing cover 130. For example, it may be difficult to machine the portion of the cover equivalent to component 140 to be as thin as component 140.

Cover 130 is attached to base 121 with screw 180, which extends through hole 136 in cover 130 and is received by threaded hole 127 in base 121. In other implementations, cover 130 may be attached to base 121 using different techniques. Cover 130 includes protrusion 134, which extends in the direction of base 121 when cover 130 is mounted on base 121. Protrusion 134 provides an edge 135 that serves as a pivot point for cover 130 when cover 130 is secured to base 121 by screw 180. Protrusion 134 configured to create a moment that holds a remote portion of cover 130, i.e., the end including component 140, tightly against base 121 when cover 130 is secured to base 121 with screw 180. In this manner, the design of cover 130 allows it to be securely fastened to base 121 with a single screw.

FIG. 4 illustrates shroud cover 230 mounted on base 121 to shield HGA 170 from airflow produced from a rotating test disc by substantially enclosing HGA 170. Shroud cover 230 is similar to shroud cover 130 (FIGS. 3A-3B) except that shroud cover 230 consists of a single component and only includes a single aperture. For brevity, some features already described with respect to shroud cover 130 are not described with respect to shroud cover 230.

The single aperture of cover 230 allows space for the head 172 to interface with a test disc for a dynamic electrical test. The single aperture of cover 230 also provides space that allows retractable finger 152 to move into position to deflect load beam 174.

Cover 230 fits closely within sidewalls 122 (FIG. 2) of base 121 to limit airflow from passing through the interface of base 121 and cover 230. In other implementations, sidewalls 122 may be part of cover 230 or a combination of cover 230 and base 121.

During a test procedure, such as a dynamic electrical test, HGA 170 is placed on mounting platform 165 and secured by collet fingers 171. Then, load finger 152 is use to deflect load beam 174 to bring head 172 below sidewalls 122 of shroud base 121. Next, shroud cover 130 is placed on shroud base 121 and secured with screw 180 to enclose HGA 170 within shroud 120. Alternatively, shroud cover 230 may be placed on shroud base 121. HGA 170 is then positioned in proximity to test disc 160. Load finger 152 is extended enough to allow HGA 170 to interface with test disc 160 such that head 172 is supported by an air-bearing formed between the head and test disc 160. HGA 170 is then electrically tested by performing read and write operations on test disc 160. Following the electrical testing of HGA 170, load finger again deflects load beam 174, pulling head 172 away from test disc 160. Then shroud cover 130 is removed and collet fingers 171 release HGA 170. HGA tester 101 may then be used to test additional HGAs.

FIGS. 5A-5B illustrate shroud cover 230. Shroud cover 230 is functionally equivalent to shroud cover 130 (FIGS. 2 and 3A-3B). In contrast to cover 130, which includes two components 132, 140, cover 230 is formed from a single component. As an example, cover 230 may be formed from stainless steel or other metal.

Cover 230 includes two apertures 242, 244. Aperture 242 allows a head of an HGA to interface with a test disc. Comparatively, aperture 244 provides space that allows a retractable finger to move into position to deflect the load beam of the HGA. Notably, base 121 (FIG. 2) of shroud 320 (FIG. 6) is also configured to provide space that allows retractable finger 152 to move into position to deflect load beam 174. For example, base 121 includes depression 124 in sidewalls 122.

Cover 230 includes depression 240 that leaves a very thin amount of material adjacent to apertures 242, 244. For example, the thickness of cover 230 at depression 240 may be in the range of 0.0005 inches to 0.010 inches thick. As another example, the thickness of cover 230 at depression 240 may be about 0.002 inches thick. The small thickness of the thickness of cover 230 at depression 240 is necessary to allow an HGA to be loaded on a test disc without contacting cover 230.

As shown in FIG. 6 cover 230 is combined with base 121 to form shroud 320. Cover 230 is attached to base 121 with a screw, which extends through hole 236 in cover 230 and is received by threaded hole 127 in base 121. In other implementations, cover 230 may be attached to base 121 using different techniques. Cover 230 includes protrusion 234, which extends in the direction of base 121 when cover 230 is mounted on base 121. Protrusion 234 provides an edge 235 that serves as a pivot point for cover 230 when cover 230 is secured to base 121 by a screw. Protrusion 234 configured to create a moment that holds a remote portion of cover 230, i.e., the end including apertures 242, 244 tightly against base 121 when cover 230 is secured to base 121. In this manner, the design of cover 230 allows it to be securely fastened to base 121 with a single screw.

Shroud 320 shields an HGA from airflow produced by rotating a test disc by substantially enclosing the HGA. As previously described with respect to FIG. 2, base 121 includes sidewalls 122 that shield an HGA from airflow. Cover 230 fits closely within sidewalls 122 to limit airflow passing through the interface of base 121 and cover 230. In other implementations, sidewalls 122 may be part of cover 230 or a combination of cover 230 and base 121. Other specific implementations for shielding an HGA from airflow are also possible.

Shroud Testing

A series of tests were performed. The results of the tests demonstrate the effectiveness of including a shroud to shield an HGA from airflow produced by a rotating test disc used in dynamic electrical testing of the HGA.

In a first test, an HGA test apparatus not including a shroud was operated using a test disc rotating a 15,000 RPM. The same test disc velocity was used for all of the testing. The HGA test apparatus was found to facilitate HGA testing at track densities of up to 131,000 TPI.

In a second test, a HGA test apparatus including a shroud base including sidewalls configured to shield the tested HGA from air turbulence caused by the test disc was used. An example of this configuration is shown in FIG. 1C. The HGA test apparatus for this second test was found to facilitate HGA testing at track densities of up to 156,000 TPI.

In a third test, a cover was added to the shroud base. The cover included a single aperture to allow the head of the HGA being tested to interface with the test disc as well as provide a space for a retractable finger to deflect the load beam of the head gimbal assembly. An example of this configuration is shown in FIG. 4. When the HGA test apparatus was operated for this third test, the HGA test apparatus was found to facilitate HGA testing at track densities of up to 169,000 TPI.

In a fourth test, a different cover was added to the shroud base. The cover included one aperture to allow the head of the HGA being tested to interface with the test disc and a separate aperture to provide a space for a retractable finger to deflect the load beam of the head gimbal assembly. An example of this configuration is shown in FIGS. 1A and 1B. Another example is shown in FIG. 6. When the HGA test apparatus was operated for this fourth test, the HGA test apparatus was found to facilitate HGA testing at track densities of up to 246,000 TPI.

The implementations described above and other implementations are within the scope of the following claims.

The invention claimed is:

1. An assembly for testing a head gimbal assembly comprising:
    a rotatable test disc;
    a mounting surface configured to mount the head gimbal assembly, wherein the mounting surface is located in proximity to the test disc to facilitate loading the head gimbal assembly on the test disc;
    a loading mechanism including a retractable finger that deflects a load beam of the head gimbal assembly for loading the head gimbal assembly on the test disc; and
    a shroud configured to shield the head gimbal assembly from airflow produced when the test disc rotates, wherein the shroud includes a base and a removable cover secured to the base, wherein the removable cover includes a first aperture that allows a head of the head gimbal assembly to interface with the test disc and a second aperture that allows the retractable finger to move into position to deflect the load beam.

2. The assembly of claim 1, wherein the shroud substantially encloses the head gimbal assembly.

3. The assembly of claim 1, wherein the shroud includes a base, wherein the removable cover includes a protrusion that extends in the direction of the base, wherein the protrusion is configured to create a moment that holds a remote portion of the cover tightly against the base when the cover is secured to the base by a force located in proximity to the protrusion.

4. The assembly of claim 3, further comprising a screw, wherein the screw extends through a through-hole of the cover and connects to the base, wherein the force is applied by a head of the screw.

5. The assembly of claim 1, wherein the shroud includes a base, wherein the base includes sidewalls that extend towards the cover.

6. The assembly of claim 1, wherein the shroud shields a majority of a tail of the head gimbal assembly from airflow produced when the rotatable test disc rotates.

7. The assembly of claim 1, wherein the mounting surface is a stationary mounting surface.

8. The assembly of claim 1, wherein the head gimbal assembly includes a boss hole, wherein the assembly further comprises retractable fingers configured to secure the head gimbal assembly to the mounting surface at the boss hole.

9. The assembly of claim 1, further comprising the head gimbal assembly, wherein the head gimbal assembly is mounted on the mounting surface.

10. A method for testing a head gimbal assembly comprising:
    mounting the head gimbal assembly on a mounting platform;
    covering the head gimbal assembly with a shroud comprising a base and a removable cover attached to the base; and
    loading the head gimbal assembly on a rotating test disc with a loading mechanism comprising a retractable finger that deflects a load beam of the head gimbal assembly for loading the head gimbal assembly on the test disc;
    wherein the shroud is configured to shield the head gimbal assembly from airflow produced when the test disc rotates, and wherein the removable cover comprises a first aperture that allows a head of the head gimbal assembly to interface with the test disc and a second aperture that allows the retractable finger to move into position to deflect the load beam.

11. The method of claim 10, wherein the shroud substantially encloses the head gimbal assembly.

12. The method of claim 10, wherein the base includes sidewalls that extend towards the cover.

13. The method of claim 10, wherein the shroud shields a majority of a tail of the head gimbal assembly from airflow produced when the rotatable test disc rotates.

14. The method of claim 10, wherein the head gimbal assembly includes a boss hole, wherein the assembly further comprises retractable fingers configured to secure the head gimbal assembly to the mounting surface at the boss hole.

15. The method of claim 10, further comprising positioning the mounting platform including the head gimbal assembly proximate to the test disc prior to loading the head gimbal assembly on the test disc.

16. The method of claim 10, further comprising electrically testing the head gimbal assembly by writing to and reading from the test disc.

* * * * *